US008500439B2

(12) United States Patent
Muller

(10) Patent No.: US 8,500,439 B2
(45) Date of Patent: Aug. 6, 2013

(54) EXTRUSION BLOW-MOLDING DEVICE AND METHOD FOR PRODUCING PLASTIC CONTAINERS

(75) Inventor: Alexander Muller, Altstatten (CH)

(73) Assignee: Soplar S.A. (CH)

( * ) Notice: Subject to any disclaimer, the term of this patent is extended or adjusted under 35 U.S.C. 154(b) by 283 days.

(21) Appl. No.: 12/812,175

(22) PCT Filed: Jan. 8, 2009

(86) PCT No.: PCT/CH2009/000008

§ 371 (c)(1), (2), (4) Date: Jul. 8, 2010

(87) PCT Pub. No.: WO2009/086651

PCT Pub. Date: Jul. 16, 2009

(65) Prior Publication Data

US 2010/0276850 A1 Nov. 4, 2010

(30) Foreign Application Priority Data

Jan. 11, 2008 (CH) .......................................... 41/08

(51) Int. Cl.
*B29C 45/00* (2006.01)

(52) U.S. Cl.
USPC ........... 425/574; 425/150; 425/522; 425/532; 264/540

(58) Field of Classification Search
USPC .................. 425/150, 522, 532, 574; 264/540
See application file for complete search history.

(56) References Cited

U.S. PATENT DOCUMENTS 2,757,416 A * 8/1956 Montross .................. 264/297.2
3,943,214 A 3/1976 Turek (Continued)

FOREIGN PATENT DOCUMENTS

| | | |
|---|---|---|
| DE | 29807426 | 8/1998 |
| EP | 0858878 | 8/1998 |
| WO | WO 02/081180 | 10/2002 |
| WO | WO 2004/078457 | 9/2004 |

OTHER PUBLICATIONS

German Patent Abstract of DE 29807426 U Patent Abstract (1998).*

*Primary Examiner* — Amjad Abraham
(74) *Attorney, Agent, or Firm* — Morriss O'Bryant Compagni, PC

(57) ABSTRACT

An extrusion blow-molding device (1) for producing plastic containers, particularly plastic bottles, is proposed, comprising an extruder head (3), which is connected to at least one extruder (2) for plastic material and has at least one extrusion die (4), a blow-molding tool arrangement (5) having at least one blow-molding cavity (6) and at least one injection device (7), which is disposed on the side of the blow-molding tool arrangement (5) facing away from the extruder head (3) and can be inserted into the blow-molding cavity (6) through an opening provided there. During a production cycle, the extruder head (3) can be axially adjusted in terms of the height thereof relative to the blow-molding tool arrangement (5). To do so, the extruder (2) is articulated along the longitudinal extension thereof on a rotational axis (9) and can be tilted in the manner of a rocker, and the extruder (2) is configured such that the height thereof about the rotational axis (9) thereof can be adjusted. In this way, for the production of plastic containers having a large height, a new starting position for tilting the extruder (2) can be set in that the extruder (2), to include the rotational axis (9) thereof, is raised.

17 Claims, 2 Drawing Sheets

U.S. PATENT DOCUMENTS 4,998,873 A * 3/1991 Martin et al. ................. 425/541
5,639,415 A * 6/1997 Kato et al. .................... 264/532
7,067,167 B2 * 6/2006 Damsgard et al. ............ 426/383
2005/0067742 A1 * 3/2005 Kessler ......................... 264/542

* cited by examiner

EXTRUSION BLOW-MOLDING DEVICE AND METHOD FOR PRODUCING PLASTIC CONTAINERS

CROSS-REFERENCE TO RELATED APPLICATIONS

This application claims priority to PCT/CH2009/000008 filed on Jan. 8, 2009 and CH41/08 filed on Jan. 11, 2008, the entirety of each of which is incorporated by this reference.

BACKGROUND OF THE INVENTION

1. Field of the Invention

The invention relates to an extrusion blow molding device for producing hollow bodies according to the preamble of claim 1. The invention also relates to a method for producing plastic containers in an extrusion blow molding process.

2. State of the Art

The previously conventional containers made of white or coloured sheet metal, of glass or else of ceramic are increasingly being superseded by containers made of plastic. Mainly plastic containers are used in particular for the packaging of fluid substances, for example of beverages, oil, cleaning utensils, cosmetics, etc. The low weight and the lower costs certainly play a not inconsiderable part in this substitution. The use of recyclable plastics materials and the overall more beneficial total energy balance in the production thereof also help to promote consumer acceptance of plastic containers, in particular of plastic bottles.

Plastic containers, in particular plastic bottles, for example made of polyethylene or polypropylene, are produced by extrusion blow molding, in particular by tube blow molding. In this case, a plastic tube is extruded from an extruder head, introduced into blow molding tools, inflated via an insufflation device, for example a blow mandrel or a blow needle, as a result of excess pressure and cured by cooling. The extrusion blow molding machines used for this purpose generally have at least one extruder for supplying the plastics material. The output of the extruder is connected to the extruder head, from the outlet die of which, the opening width of which can preferably be regulated, the tube, which is extruded in one or more layers, issues. The extruded tube is transferred to a blow molding tool and inflated within the cavity thereof using the insufflation device, for example a blow mandrel or a blow needle. During inflation using a blow mandrel, the neck portion of the plastic bottle is shaped at the same time. A blow needle is used to carry out only an inflation of the plastic tube inserted into the molding cavity. The plastic tube can have one or more layers and can be extruded as a tube with viewing strips, decorative strips or, based on the circumference, with a plurality of, for example different-coloured, segments.

The blowing station with the insufflation device is conventionally arranged laterally of the extruder head and the blow molding tool, which is loaded with the extruded tube, has to be moved into the blowing station, where the insufflation device, for example a blow mandrel, is then introduced, usually from above, into the blow molding cavity. For continuous operation, two blowing stations are conventionally provided in a type of the known extrusion blow molding machines. Each blowing station is equipped with a blow molding tool. The blowing stations are in this case arranged opposing each other at both sides of the extruder and have blow molding tables with the blow molding tools which are moved alternately under the extruder head in order to receive the extruded tube. In this case, the blow molding tool is opened for retrieving the tube. After the blow molding tool has been closed, the tube is separated off between the extrusion head and the blow molding tool. Afterwards, the blow molding table is moved back into the blowing station, where the insufflation device is introduced into the cavity of the blow molding tool and the tube is inflated in accordance with the blow molding cavity and afterwards removed. In multiple extrusion heads and multiple blow molding tools, each blowing station is equipped with a corresponding number of insufflation devices which are jointly introduced into the blow molding cavities. Overall, the extruder with the extruder head and the two blowing stations form roughly the shape of a T. In this case, the extruder with the extruder head is the long stem of the T, whereas the two blow molding tables are alternately movable under the extruder head along the short horizontal line halves.

Extrusion blow molding machines are also known in which a number of blow molding tools are arranged on a rotating wheel. The wheel is positioned roughly vertically and advances the blow molding tools roughly tangentially up to the plastic tube which is continuously extruded from the extruder head. Shortly before reaching the extruded plastic tube, the advanced blow molding tool is opened in order to retrieve the tube. On further rotation of the wheel, the blow molding tool is closed around the inserted tube which is finally sheared off on further rotation. The arrangement of the blow molding tools and the rotational speed of the wheel are selected in such a way that the tube is sheared off only once the subsequent blow molding tool has closed around the next piece of tube. On further rotation of the wheel, the tube, which is located in the cavity of the blow molding tool, finally enters the blowing station, where it is inflated in accordance with the blow molding cavity via an insufflation device introduced laterally into the molding tool. Finally, the inflated hollow body is output from the blow molding tool by opening. During the further movement, the blow molding tool, which is arranged on the rotating wheel, is closed again and advanced back up to the extruder head in order to receive a further extruded tube.

WO 2004/078457 A1 discloses an extrusion blow molding device for producing hollow bodies, in particular plastic bottles, having an extruder head which is arranged in an apparatus frame and has at least one extrusion die, a blow molding tool arrangement with at least one blow molding cavity, at least one insufflation device and at least one separating means. The blow-molding tool arrangement has at its side remote from the extrusion die an orifice through which the insufflation device, which is likewise arranged at the side of the blow molding tool arrangement that is remote from the extruder head, can be introduced into the molding cavity. As a result of the selected arrangement, the extruded plastic tube is held and permanently guided throughout the entire production cycle of a container. In this case, the relative axial distance between the blow molding tool arrangement and the extruder head is altered. Conventionally, this takes place by way of a restrictedly guided axial adjustment of the height of the extruder head in relation to the blow molding tool arrangement during the production cycle. The tube with the fully inflated container is separated off only once the blow molding tool arrangement has closed around a tube portion arranged thereabove. A separating means, which is likewise arranged on the side of the blow molding tool arrangement that is remote from the extrusion die, is provided for separating-off.

In the axial adjustment of the height of the extruder head, large masses have to be moved in relatively short time portions. This results in a comparatively high energy requirement. The exact axial height adjustment is associated with comparatively high control costs. However, the precise orientation and the avoidance of incorrect positioning of the plastic tube, the reproducibility of the production process as a consequence of the use of just a single blow molding cavity and the avoidance of downtimes for lateral adjustment of the blow molding tool arrangement justify these costs. Nevertheless, it is desirable to still further simplify this extrusion blow molding device leading to outstanding results.

A device for producing hollow bodies made of plastic by extrusion blow molding is known from WO 02/081180. The device has an extrusion unit which has an extruder defining a longitudinal direction of the device and an extruder head connected to the extruder and is mounted in a housing frame. At least one blow molding station has a blow molding table with at least one molding tool provided with an opening arranged at the side of the molding tool that is remote from the extrusion die. The molding tool is movable on a lateral path running substantially perpendicularly to the longitudinal direction from an end position laterally of the extruder head into a position under the extrusion head and back again. This allows the extrusion die and the opening of the molding tool to be made to vertically overlap. The extrusion unit is mounted in the housing so as to be vertically inclinable about a horizontal axis and laterally pivotable about a vertical axis and is displaceable in the longitudinal direction. The articulated mounting is formed in the region of the centre of gravity of the extrusion unit, namely at the end region of the extruder that is remote from the extruder head. A drive unit for the extruder is flanged onto the transmission housing as a counterweight to the extruder.

The present invention is therefore provided to simplify an extrusion blow molding device based on a single blow molding tool arrangement, the extruder head being axially adjustable relative to the blow molding tool arrangement, in such a way that the design and control-related costs are reduced. It should likewise be possible to reduce the energy costs for operating the device. In this case, the advantages of the extrusion blow molding device are to be preserved, the extruder head being axially adjustable relative to the blow molding tool arrangement and the extruded plastic tube being permanently guided during the production cycle, and it should still be possible to carry out the extrusion blow molding method in accordance with the principle presented in WO 2004/078457 A1. Furthermore, it should still be possible to arrange even relatively tall blow molding tool arrangements under the extrusion die of the extruder head.

SUMMARY OF THE INVENTION

Accordingly, an extrusion blow molding device for producing plastic containers comprises an extruder head connected to at least one extruder for plastics material and has at least one extrusion die with a blow molding tool arrangement with at least one blow molding cavity. At least one insufflation device is arranged at the side of the blow molding tool arrangement that is remote from the extruder head and can be introduced through an orifice provided there into the blow molding cavity. The extruder head is axially adjustable in terms of height in relation to the blow molding tool arrangement. The extruder is articulated to a hinge pin and is mounted so as to be tiltable in a rocker-like manner about the hinge pin along its longitudinal extent. The extruder and hinge pin are arranged so as to be adjustable in height.

An associated method according to the invention comprises tilting the extruder during a cycle for producing a plastic bottle about the hinge pin in a rocker-like manner, and setting a new starting position for the tilting of the extruder to raise the extruder along with the hinge pin for producing plastic containers of high overall height.

Other developments and/or advantageous variant embodiments of the invention are further set forth herein.

The invention proposes an extrusion blow molding device for producing plastic containers, in particular plastic bottles, having an extruder head which is connected to at least one extruder for plastics material and has at least one extrusion die, a blow molding tool arrangement with at least one blow molding cavity and at least one insufflation device which is arranged at the side of the blow molding tool arrangement that is remote from the extruder head and can be introduced through an orifice provided there into the blow molding cavity. During a production cycle, the extruder head is axially adjustable in terms of height in relation to the blow molding tool arrangement. For this purpose, the extruder is articulated to a hinge pin along its longitudinal extent in the manner of a rocker.

In order to allow even plastic containers having high overall heights to be produced without difficulty using the extrusion blow molding device, the extruder and its hinge pin are in addition arranged so as to be adjustable in terms of height. This allows even relatively tall blow molding tool arrangements to be arranged under the extrusion die of the extruder head.

The tiltable articulation of the extruder allows the relative axial distance of the extrusion die from the blow molding tool arrangement to be adjusted very easily. The adjustment of the height of the extrusion die is limited to a pure tilting movement of the extruder. The extruder head, which is connected to the extruder, automatically follows the tilting movement and is pivoted upward or downward in relation to its starting position. This simplifies the design of the extrusion blow molding device. Despite the simple implementation of the axial adjustability of the extruder head, the conditions required for carrying out the extrusion blow molding method in accordance with the principle described in WO 2004/078457 A1 are fully ensured. The arrangement of the blow molding tools between the extruder head and the insufflation device is preserved. The relative adjustment, which is required for permanently guiding the extruded tube, of the distance between the blow molding tool arrangement and the extruder head is achieved by the rocker-like tilting of the extruder.

Expediently, the extruder is connected to a lifting means in the region of the extruder head. This lifting means, for example a chain drive, allows the tilting movement of the extruder to be carried out very easily and in an energy-saving manner.

During the tilting of the extruder, the extrusion die describes with the extruder head an arc of a circle. In order to allow the horizontal displacement of the extrusion die to be kept as low as possible during tilting, it has proven advantageous if the extrusion die or its orifice is arranged at the same level as the hinge pin when the extruder is oriented horizontally.

The tiltability of the extruder in relation to its horizontal starting position is designed in such a way that the extruder head describes in the region of the extrusion die a maximum lift of up to +200 mm. This lift is sufficient to be able to carry out the extrusion blow molding method with just a single blow molding tool arrangement and permanent guidance of the extruded tube in accordance with the principle described in WO 2004/078457 A1. The maximum horizontal displacement of the extrusion die at this lift is up to +20% of the maximum lift and does not lead to any problems in the axial orientation of the extruded plastic tube and the blow molding cavity.

The hinge pin is provided along the longitudinal extent of the extruder in such a way that a centre of gravity of the extruder/extruder head system remains, on the provision of maximum deflection, at all times in that portion of the extruder that extends from the hinge pin up to the end of the extruder that is remote from the extruder head. Based on the extruder head, the centre of gravity of the system is positioned at all times after the hinge pin. This ensures that the weight force is directed upward. In the case of failure of the lifting means, for example a chain drive, acting in the region of the extruder head, the extruder head is raised at all times and cannot strike the blow molding tool arrangement or lead to clamping. The raising of the extruder is greatly facilitated by this arrangement of the hinge pin and requires lower energy costs. Less energy is required for the lowering anyway, as it is after all assisted by natural gravity.

In order to further simplify the design, the extruder head is rigidly connected to the extruder. As a result, any axial adjusting movement of the extruder is transmitted directly to the extruder. Costly articulated connections may be dispensed with.

In order to allow additional height adjustability, in addition to the rocker-like tilting, the extruder head can, in a further variant embodiment of the extrusion blow molding device, also be arranged so as to be axially adjustable in terms of height. This prevents excessive tilting movements, and the extrusion die is not displaced excessively far horizontally.

The insufflation device is a blow mandrel or a blow needle. The use of a blow mandrel has the advantage that the neck portion of the inflated plastic bottle is also formed and calibrated at the same time using the blow mandrel. On use of a blow needle, only the plastic tube inserted into the molding cavity is inflated. Blow needles are for example also used in a plurality of interconnected molding cavities arranged one above another and are in this case for example fed laterally in the neck region of the bottle to be inflated. Extrusion blow molding devices can also be equipped with combinations of blow mandrels and blow needles.

The required axial adjustment of the height of the extruder head or the extrusion die relative to the blow molding tool arrangement can be carried out at relatively low energy and control costs in that during the cycle for producing a plastic bottle the extruder, which is connected to the extruder head, is tilted about a hinge pin in a rocker-like manner.

In order to keep the horizontal displacement of the extrusion die as low as possible during tilting, the extruder is tilted from a horizontal starting position in which its hinge pin is arranged at the same level as the extrusion die of the extruder head. At the same time, care is taken to ensure that the tilting leads to a maximum lift of the extruder head at its extrusion die of up to +200 mm.

For the production of plastic containers of high overall height, a more elevated starting position is set for the tilting of the extruder. This takes place in that the extruder is raised along with its hinge pin. This simple measure allows even blow molding tool arrangements having relatively high overall heights to be arranged under the extruder head and excessively large tilting movements, which might lead to non-tolerable horizontal displacements of the orifice of the extrusion die, are prevented.

A further measure to keep the horizontal displacement of the extrusion die as low as possible consists in the fact that, in addition to the height adjustment as a consequence of tilting of the extruder, the height of the extruder head is adjusted within a frame.

A further variant embodiment of the invention can also make provision for the hinge pin to be displaced, during tilting of the extruder, in conjunction with the extruder in the longitudinal direction in order to compensate for excessively large horizontal displacements of the orifice of the extrusion die.

BRIEF DESCRIPTION OF THE DRAWINGS

Further advantages and features of the invention will emerge from the following description with reference to the schematic illustrations of an exemplary embodiment, in which.

DETAILED DESCRIPTION OF THE ILLUSTRATED EMBODIMENTS

Figure 1:
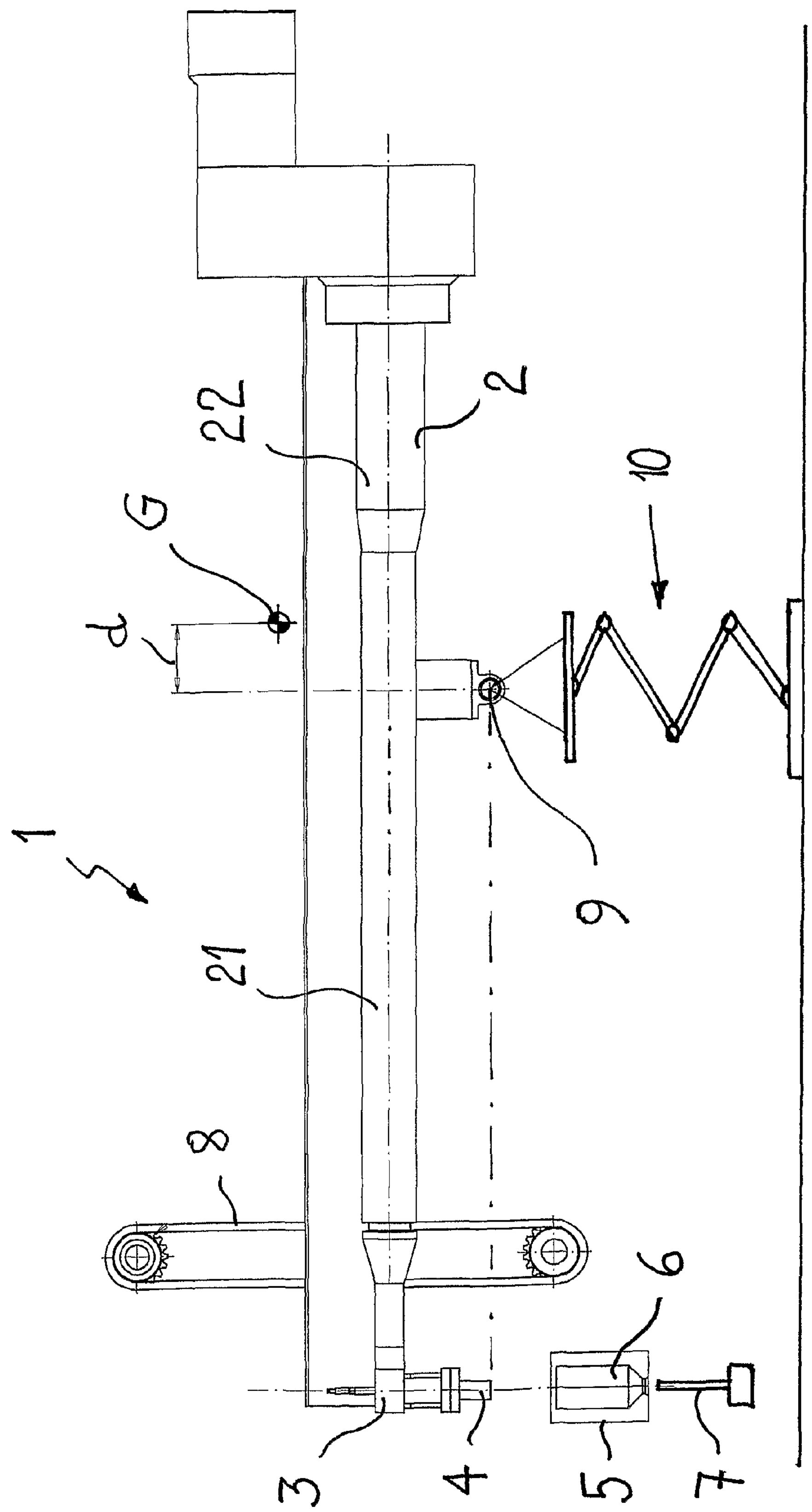
FIG. 1 is an illustration of the principle of an extrusion blow molding machine according to the invention.

FIG. 1 shows schematically the components essential for understanding the invention of an extrusion blow molding installation provided in its entirety with reference numeral 1. The extrusion blow molding installation comprises an extruder 2 connected at one, leading end to an extruder head 3. The extruder head 3 has one or more extrusion dies 4. A blow molding tool arrangement 5 having at least one blow molding cavity 6 is arranged below the extruder head 3. Conventionally, there are the same number of extrusion dies 4 and blow molding cavities 6. The illustrated blow molding cavity 4 [sic] opens out at the side of the blow molding tool arrangement 5 that is remote from the extrusion die 4. An insufflation device 7, for example a blow mandrel, which is oriented toward the orifice of the blow molding cavity 6 and arranged at the side of the blow molding tool arrangement 5 that is remote from the extrusion die 4, is associated with each blow molding cavity 6. The insufflation device 7 can be introduced into the blow molding cavity 6 through the orifice in order to inflate an inserted extruded tube portion in accordance with the molding cavity 6 to form a plastic container, for example to form a plastic bottle.

The extrusion die 4, the blow molding cavity 6 in the blow molding tool arrangement 5 and the insufflation device 7 are substantially aligned with one another axially. During a cycle for producing the plastic container, the relative distance between the extrusion die 4 and the blow molding tool arrangement 5 is altered. A plastic container is in this case produced in accordance with the principle which is described in WO 2004/078457 A1 and is in this respect declared an integral part of the present patent application. The plastic tube, which is extruded from the extrusion die 4 in one or more layers, is permanently guided in accordance with the principle described therein. The plastic tube is in this case guided through the extrusion die 4 and the blow molding tool arrangement 5 or, when the mould parts are opened, through the extrusion die 4 and the insufflation device 7 which is located in the fully inflated plastic container. The fully inflated plastic container is separated off from the extruded plastic tube only once the mould parts of the blow molding tool arrangement 5 have closed around a new portion of the plastic tube extruded from the extrusion die 4. In this case, the separating takes place at the side of the blow molding tool arrangement 5 that is remote from the extrusion die 4 with the aid of a separating device which is provided there and is not illustrated in greater detail in FIG. 1.

In order to implement the axial relative movement between the extrusion die 4 and the blow molding tool arrangement 5, the extruder 2 is articulated along its longitudinal extent to a hinge pin 9. The articulated mounting allows the extruder 2 to tilt about the hinge pin 9 in the manner of a rocker. The tilting movement is transmitted to the extruder head with the extrusion die 4. As a result, the distance between the extrusion die 4 and the blow molding tool arrangement 5 arranged thereunder is variable. For triggering the tilting movement, the extruder 2 is connected to a lifting means 8 in the region of the extruder head 3. For example, the lifting means 8 is a chain drive. As is indicated in FIG. 1 by a dot-dash line, the hinge pin 9 and the extrusion die 4 or the orifice thereof are located at the same level when the extruder 2 is oriented horizontally. Starting from this starting position, the extruder can be raised or lowered to a predefined degree.

The hinge pin 9 is arranged along the longitudinal extent of the extruder 2 in such a way that an overall centre of gravity G of the extruder 2/extruder head 3 system is arranged in a rearward portion 22 of the extruder 2 that extends from the hinge pin 9 to the end of the extruder 2 that is remote from the extruder head 3. The second, front portion of the extruder is denoted by reference numeral 21. The distance d of the overall centre of gravity G from the hinge pin 9 is in this case selected in such a way that, even on maximum positive or negative deflection of the extruder 2 in relation to its horizontal starting position, the overall centre of gravity G remains in the rearward portion 22 of the extruder. This measure ensures that the weight force on the extrusion die 4 is directed at all times in the direction pointing away from the blow molding tool arrangement 5, that is to say upward. This reliably prevents the extruder from tilting downward in accordance with the orientation of gravity and the extrusion die 4 from striking the upper side of the blow molding tool arrangement 5 in the event of a failure of the lifting means 8.

In the exemplary embodiment illustrated schematically in FIG. 1 of the extrusion blow molding device 1, in addition to the tiltability, the extruder 2, along with the securely flanged-on the extruder head 3, is arranged so as also to be adjustable in terms of height. For this purpose, the extruder 2 is arranged on a lifting stage 10, for example in the region of the linking to the hinge pin 9. This allows the horizontal starting position of the extruder 2 to be adapted to blow molding tool arrangements 5 of differing height. This is for example required when plastic containers having higher overall heights are to be produced. Excessively large pivoting angles of the extruder head 3 or the extrusion die 4 are avoided during tilting as a result of the adjustability of the height of the extruder 2 along with its articulation to the hinge pin 9. This would otherwise lead to the position of the orifice of the extrusion die 4 being displaced too far horizontally. This also prevents mispositioning of the extruded tube in the production of plastic containers having high overall heights.

Figure 2:
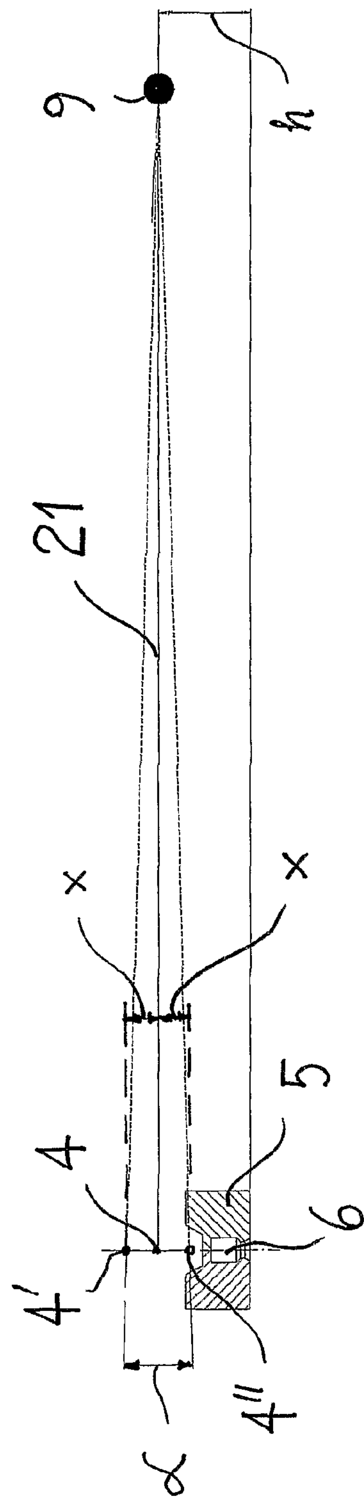
FIG. 2 is a schematic diagram of the tilting of an extruder head in small container sizes.
Figure 3:
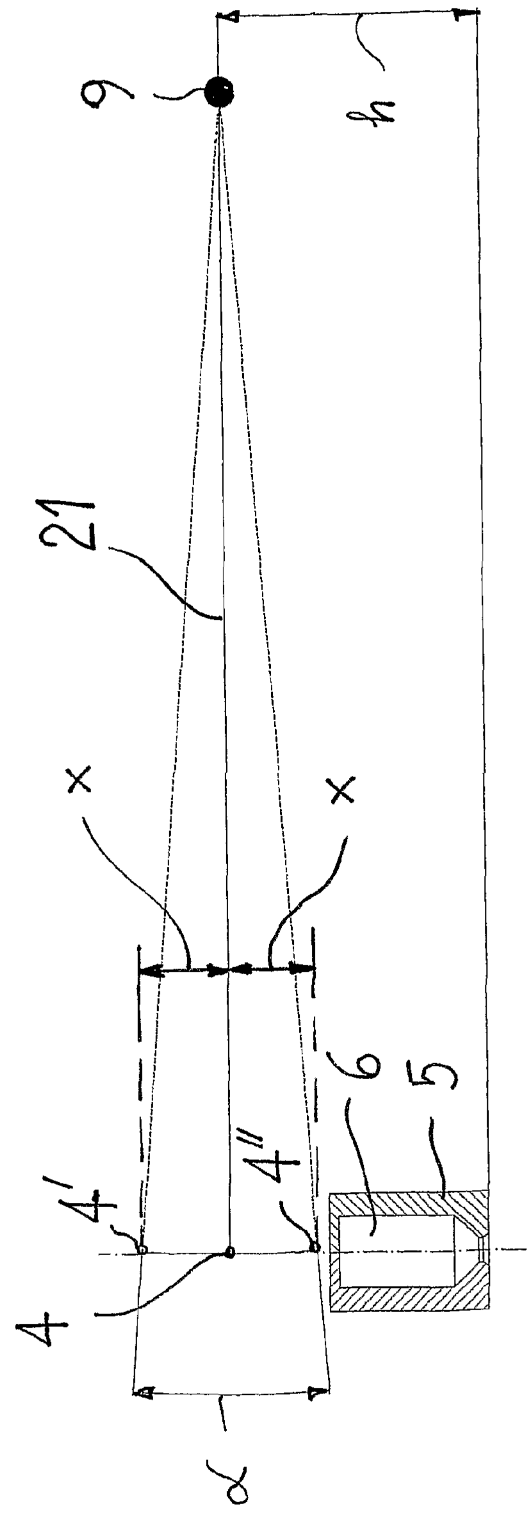
FIG. 3 is a schematic diagram of the tilting of the extruder head in blow molding tool arrangements with high overall heights.

FIGS. 2 and 3 show schematically the conditions during tilting of the extruder in two blow molding tools 5 having differingly high overall heights for differingly tall molding cavities 6 for differingly large plastic containers. 21 denotes in each case the front portion of the extruder that extends from the hinge pin 9 up to the orifice of the extrusion die, which is indicated in FIGS. 2 and 3 in each case by the reference numeral 4. In this regard, the solid lines denote in each case the horizontal starting position in which the orifice of the extrusion die 4 is arranged at the same level as the hinge pin 9. The broken lines indicate the end positions of the extruder as tilted from the horizontal position into the positive (top) or negative (bottom) position. The maximum deflection of the orifice of the extrusion die upward and downward is indicated in each case by the reference numerals 4' and 4" respectively. The lift occurring in this regard in the positive and in the negative direction is denoted in each case by x and is up to ±200 mm. The orifice of the extrusion die 4 moves along an arc of a circle to its upper and lower end positions 4' and 4". The maximum pivoting angle, measured over the two end positions 4', 4" of the orifice of the extrusion die 4, is denoted by $\alpha$ and is composed of two pivoting angles of equal size $\pm\alpha/2$ from the central starting position downward and upward respectively.

It may be seen from FIG. 2 that, owing to the relatively long distance from the hinge pin 9 and the relatively low lift, the orifice of the extrusion die 4 is in practice barely perceptibly displaced in the horizontal direction during tilting into its two end positions 4' and 4". FIG. 3, on the other hand, shows that a greater lift leads to appreciable horizontal displacement of the end positions 4' and 4" of the orifice of the extrusion die 4 in relation to the starting position. At maximum lift, this displacement is up to 10% of the maximum lift. Displacements in this order of magnitude are tolerable and do not lead to any problems during grasping of the extruded tube by the molding tools. In FIG. 2, in the region of the hinge pin 9, the adjustability of the height thereof is also indicated by the reference letter h. The adjustability h of the height of the hinge pin 9 of the extruder allows allowance to be made for the requirements of blow molding tools 5 having greater overall heights without having to carry out excessively large tilting movements which might lead to intolerable horizontal displacements of the orifice of the extrusion die 4.

For the production of especially tall plastic vessels, provision may also be made for the extruder head to be able to be adjusted in terms of height in relation to its starting position, in addition to the change in position as a consequence of tilting. A further variant embodiment of the invention can also furthermore provide for the hinge pin to be displaced, during the tilting of the extruder, in conjunction with the extruder in the longitudinal direction in order to compensate for excessively large horizontal displacements of the orifice of the extrusion die.

The schematic drawings show an extruder head with just one extrusion die and a blow molding tool with just one blow molding cavity. It goes without saying that the arrangement described and the method described can also be applied in extrusion blow molding devices with multiple die tools and multiple blow molding tools or arrangements of single and/or multiple blow molding tools. The number of insufflation devices is in this case adapted to the number of blow molding cavities. The device according to the invention may be an extrusion blow molding device for continuous or discontinuous extrusion of the plastic tube. Likewise, the method according to the invention can be carried out in the case of a plastic tube extruded continuously and discontinuously.

The invention claimed is:

1. An extrusion blow molding device for producing plastic bottles, comprising: an extruder head which is connected to at least one extruder for plastics material and has at least one extrusion die, a blow molding tool arrangement with at least one blow molding cavity, at least one insufflation device which is arranged at the side of the blow molding tool arrangement that is remote from the extruder head and can be introduced through an orifice provided there into the blow molding cavity, the extruder head being axially adjustable in terms of height in relation to the blow molding tool arrangement, and a hinge pin, the extruder articulated to the hinge pin and mounted so as to be tiltable in a rocker-like manner about the hinge pin along its longitudinal extent and in that the at least one extruder and the hinge pin are arranged so as to be adjustable in height, wherein the adjustment in height is provided by a lifting mechanism attached to the hinge pin, the lifting mechanism capable of lifting both the hinge pin and the extruder simultaneously.

2. The extrusion blow molding device according to claim 1, wherein the at least one extruder is connected to a lifting device comprised of a chain drive.

3. The extrusion blow molding device according to claim 1, wherein the extrusion die is arranged at the same level as the hinge pin when the at least one extruder is oriented horizontally.

4. The extrusion blow molding device according to claim 3, wherein the at least one extruder is tiltable in relation to its horizontal starting position in such a way that the extruder head provides in the region of the extrusion die a maximum lift of up to approximately 200 mm.

5. The extrusion blow molding device according to claim 1, wherein the hinge pin is provided along the longitudinal extent of the at least one extruder in such a way that a center of gravity of the combination of the at least one extruder and extruder head is positioned at a location of maximum deflection in a rearward portion of the at least one extruder that extends from the hinge pin up to a distal end of the at least one extruder that is remote from the extruder head.

6. The extrusion blow molding device according to claim 1, wherein the extruder head is rigidly connected to the at least one extruder.

7. The extrusion blow molding device according to claim 1, wherein, in addition to the rocker-like manner of tilting, the extruder head is axially displaceable in height.

8. The extrusion blow molding device according to claim 1, wherein the hinge pin is axially displaceable.

9. The extrusion blow molding device according to claim 1, wherein the insufflation device is one of a blow mandrel or a blow needle.

10. A method for producing plastic bottles comprising:

providing an extrusion blow molding device, comprising:
an extruder head connected to at least one extruder for plastics material and having at least one extrusion die;
a blow molding tool arrangement having at least one blow molding cavity;
and at least one insufflation device arranged at the side of the blow molding tool arrangement, spaced from the extruder head and configured to be introduced through an orifice provided in the blow molding cavity, the extruder head being axially adjustable in height in relation to the blow molding tool arrangement, and a hinge pin, the extruder articulated to the hinge pin and mounted so as to be tiltable in a rocker-like manner about the hinge pin along its longitudinal extent, the at least one extruder and the hinge pin arranged to be adjustable in height; tilting the at least one extruder during a cycle for producing a first plastic bottle, having a first height, about the hinge pin in the rocker-like manner; and setting a new starting position for the tilting of the extruder to raise the extruder along with its hinge pin for producing a second plastic bottle having a second height that is greater than the first height of the first bottle, wherein raising the extruder along with the hinge pin is provided by a lifting mechanism attached to the hinge pin, the lifting mechanism capable of lifting both the hinge pin and the extruder simultaneously.

11. The method according to claim 10, further comprising tilting the extruder from a horizontal starting position in which an extrusion die of the extruder head is arranged at the same level as the hinge pin and in that the tilting leads to a maximum lift of the extruder head at its extrusion die of up to approximately 200 mm.

12. The method according to claim 10, further comprising tilting the extruder in such a way that a center of gravity of the combination of the extruder head and the at least one extruder, in a position of maximum deflection, does not overshoot the location of the hinge pin in a direction of the extruder head, but remains in a rearward portion of the at least one extruder that extends from the hinge pin up to a distal end of the extruder that is remote from the extruder head.

13. The method according to claim 10, further comprising axially adjusting the extruder head in height.

14. A method for producing plastic bottles comprising:

providing an extrusion blow molding device, comprising:
an extruder head connected to at least one extruder for plastics material and having at least one extrusion die;
a blow molding tool arrangement having at least one blow molding cavity;
and at least one insufflation device arranged at the side of the blow molding tool arrangement, spaced from the extruder head and configured to be introduced through an orifice provided in the blow molding cavity, the extruder head being axially adjustable in height in relation to the blow molding tool arrangement, and a hinge pin, the extruder articulated to the hinge pin and mounted so as to be tiltable in a rocker-like manner about the hinge pin along its longitudinal extent, the at least one extruder and the hinge pin arranged to be adjustable in height; tilting the at least one extruder during a cycle for producing a first plastic bottle, having a first height, about the hinge pin in the rocker-like manner; setting a new starting position for the tilting of the extruder to raise the extruder along with its hinge pin for producing a second plastic bottle having a second height that is greater than the first height of the first bottle, wherein raising the extruder along with the hinge pin is provided by a lifting mechanism attached to the hinge pin, the lifting mechanism capable of lifting both the hinge pin and the extruder simultaneously; and displacing the hinge pin in a longitudinal direction of the at least one extruder during tilting of the at least one extruder.

15. The method according to claim 14, further comprising tilting the extruder from a horizontal starting position in which an extrusion die of the extruder head is arranged at the same level as the hinge pin and in that the tilting leads to a maximum lift of the extruder head at its extrusion die of up to approximately 200 mm.

16. The method according to claim 14, further comprising tilting the extruder in such a way that a center of gravity of the combination of the extruder head and the at least one extruder, in a position of maximum deflection, does not overshoot the location of the hinge pin in a direction of the extruder head, but remains in a rearward portion of the at least one extruder that extends from the hinge pin up to a distal end of the extruder that is remote from the extruder head.

17. The method according to claim 14, further comprising axially adjusting the extruder head in height.

* * * * *